United States Patent [19]
Jenkins et al.

[11] 4,281,471
[45] Aug. 4, 1981

[54] RODENT CONTROL DEVICES

[75] Inventors: David L. Jenkins, Charlbury; James A. Gibson, Sanderstead, both of England

[73] Assignee: Check Fumigation and Pest Control Limited, Reading, England

[21] Appl. No.: 971,013

[22] Filed: Dec. 15, 1978

[30] Foreign Application Priority Data

Dec. 16, 1977 [GB] United Kingdom ............... 52571/77
Jul. 14, 1978 [GB] United Kingdom ............... 29959/78

[51] Int. Cl.$^3$ .......................................... A01M 25/00
[52] U.S. Cl. ..................................................... 43/131
[58] Field of Search ............................. 43/131, 132 R

[56] References Cited

U.S. PATENT DOCUMENTS

| | | | |
|---|---|---|---|
| 1,283,018 | 10/1918 | Albrecht | 43/65 |
| 1,820,186 | 8/1931 | Gaskins | 43/131 |
| 2,587,397 | 2/1952 | Smith | 43/131 |
| 2,683,953 | 7/1954 | Hopkins | 43/131 |
| 3,045,387 | 7/1962 | Simpson | 43/131 |
| 3,643,371 | 2/1972 | Gordon | 43/131 |
| 4,132,026 | 1/1979 | Dodds | 43/131 |

FOREIGN PATENT DOCUMENTS

| | | | |
|---|---|---|---|
| 852870 | 9/1977 | Belgium . | |
| 2111022 | 9/1972 | Fed. Rep. of Germany | 43/131 |
| 1337380 | 7/1962 | France | 43/131 |
| 1463757 | 11/1966 | France | 43/131 |
| 1567803 | 5/1980 | United Kingdom . | |

Primary Examiner—Harold D. Whitehead
Attorney, Agent, or Firm—Young & Thompson

[57] ABSTRACT

Apparatus for location in places where foodstuffs are or may be stored takes the form of elongated tubes of shapes and sizes so that mice can go through them. Cartridges carrying a rodenticide placed at intervals along the tubes so that mice traversing the tubes contact the rodenticide and become affected by it. A particular feature of the invention is that the rodenticide is provided on raised parts of the cartridges which the mice have to stretch over, so making maximum contact with the rodenticide.

6 Claims, 14 Drawing Figures

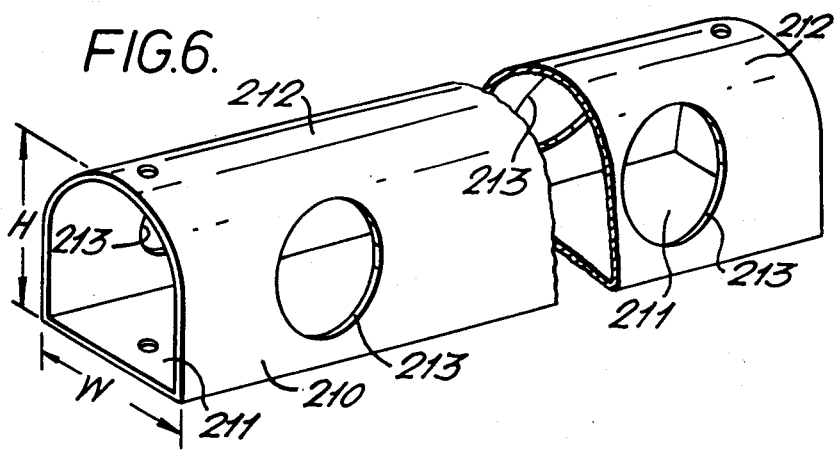
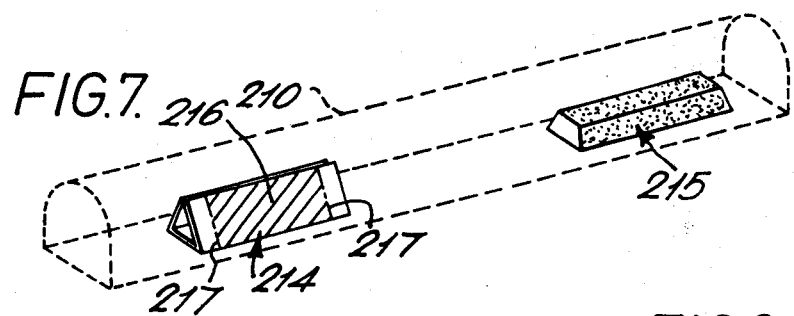
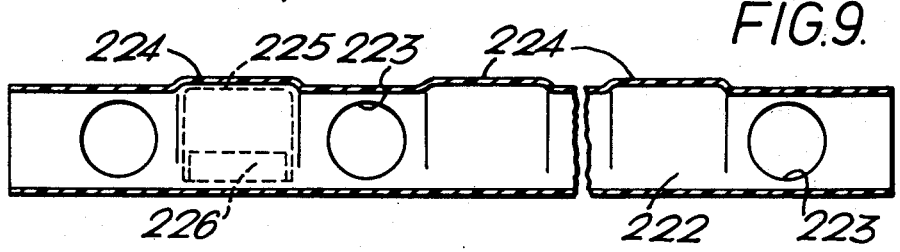
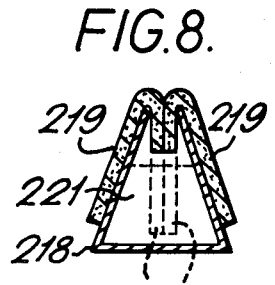
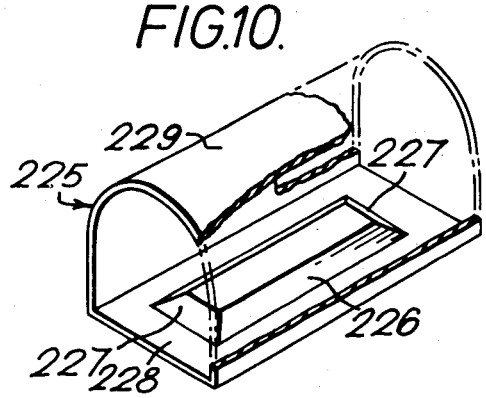

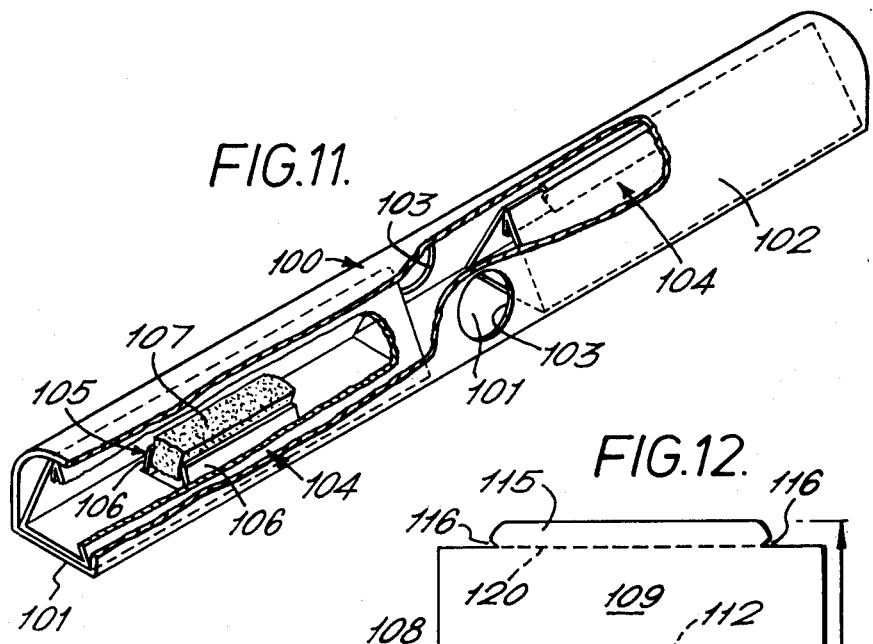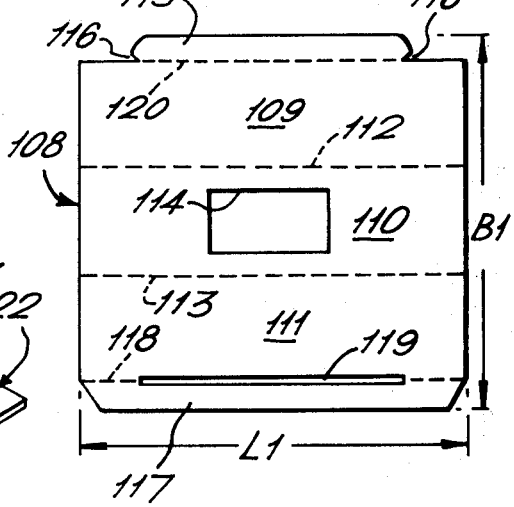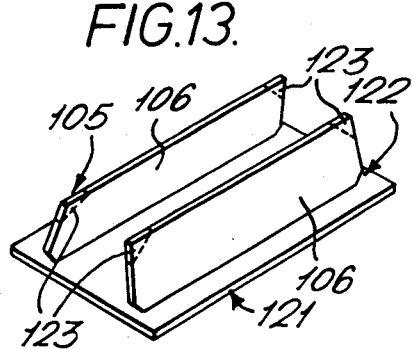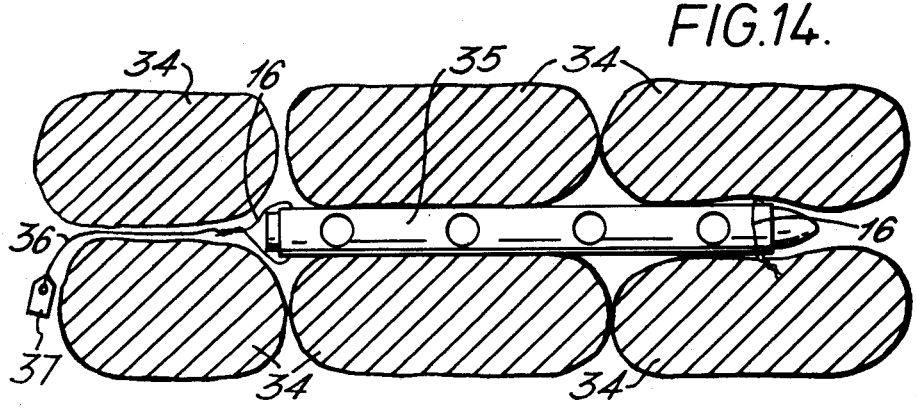

RODENT CONTROL DEVICES

DESCRIPTION

This invention relates to devices or apparatus for the control of mice. The invention enables a high degree of selective mouse control to be effected, as the devices and methods of the invention can be employed to effect maximum contact between mice and an appropriate pesticide, with minimum action against non-target animal species, including humans, which may enter an area where pest control by employment of devices and/or apparatus according to the invention is being carried out.

In addition to mouse control by trapping, conventional control methods as practised for many years have used various forms of poisoned bait or various forms of toxic tracking powders. Baits have a number of important disadvantages, as they can often only be located in places, e.g. in a food store, where mice may preferentially eat alternative foods and will not touch rodenticidal baits, the baits break up or otherwise become more widely spread in time, often contaminating the stored food itself and, they are also likely to affect humans and other species for which they are not intended. The kind of major problem attendant upon the use of poisoned baits is well illustrated by a known form of bait block. For safety, this as made carries a prominent poison warning upon its exposed surface, but this part of the block often is the first to be consumed by mice in use, so that a large supply of unmarked poison is soon produced.

Tracking powders are commonly used, because they not only have the desired rodenticial effect, but also they can be distributed so as to indicate, by being disturbed, that mice are liable to traverse the selected areas where the powder has been laid down. They have serious disadvantages however, among which are not only the liability to spread into and contaminate adjacent stored food and to harm humans or other non-target species, in common with conventional baits, but also they can become widely spread very readily, possibly even by carriage on air currents. Also, unlike baits, they have no attractive effect and so must be located where mice travel and these locations therefore must be established by trial. Methods have been developed, sometimes with the use of special devices, for improving the effectiveness and utility of tracking powders. For instance, the powder can be placed in a number of bait stations, which are then located where the mice are likely to travel, preferably, at sites found by experiment to lie between their harbourage locations and their feeding locations. A known and simple device for use as a tracking powder station in this way consists of a length of tubing, made for instance by nailing together wooden planks or from rainwater pipes or mailing tubes, in which a quantity of tracking powder is placed. Another way of employing tracking powders is to blow them into animal burrows, but these have to be located and there are other attendant disadvantages, such as have already been mentioned.

A recent development in mouse tracking powder use is the DLP-787 "Track Pack" marketed by Röhm and Haas. A long plastics tray with access holes in the upper parts of its end walls has long side walls and is divided into five compartments by transverse walls. The entire tray can be a one-piece plastics article and, in use, is fitted into a long cardboard tube, so that mice can get into the tray only through the access holes. An attractant is placed in the middle compartment and two quantities of single-dose tracking powder in the compartments on either side of it, the end compartments being left empty. In use, the prepared packs are placed where mice are thought to travel, and the intention is that mice are attracted by the bait in the middle compartment and, to gain access to it, must go into the tray and make contact with the rodenticide in the compartments on either side. The hope is that either the rodenticide kills the mice in the pack or that any loose rodenticide on a mouse leaving the pack falls off into one or other of the end compartments. In practice, there is always the possibility that mice will contaminate adjacent stored food with the rodenticide adhering to them as they leave the pack, so that the end compartments will not necessarily ensure that the tracking powder stays inside the pack. Also, personnel have to handle the bait and tracking powder when preparing new packs.

Despite the various methods and devices which have found application already in the control of mice, both domestically and industrially, especially in commercial food preparation and handling premises, a distinct need remains for apparatus and methods for mice control which:

(i) ensure maximum contact between mice and rodenticide;

(ii) ensure minimum or even zero contact between operators and rodenticide;

(iii) ensure minimum or even zero contact between the locus of use and the rodenticide and, especially, between stored food and rodenticide;

(iv) ensure maximum mortality of mice after return to their normal harbourage;

(v) provide for simple location and relocation of devices in areas which are either to be kept free from mice or to be made free when already infested;

(vi) provide for simple recovery and inspection of devices, even from stockpiled food;

(vii) allow for simple and total destruction, e.g. by combustion, of used devices and their contents, where desired;

(viii) allow for simple and inexpensive manufacture and assembly of devices.

The present invention is based upon the discovery of new aspects of mice behaviour and the application of that discovery to the devising, manufacture and use of apparatus comprising mouse control devices, together with methods of mouse control comprising the employment of such devices.

Animal behaviour studies have been carried out extensively and have revealed much information which was not previously known. The methods and apparatus of the invention make use both of the results of these behaviour studies and also of known mice behaviour patterns. It is known that generally effective methods of mice control can be based upon the use of rodenticides, possibly in the form of tracking powders, as already indicated, which are distributed in the places most likely to be traversed by the mice which are to be exterminated, either as edible bait or in the form of dusts, greases or gels or other formulations which will contaminate the mice, typically by contacting their paws or fur, so that the desired rodenticidal action occurs following grooming behaviour and consequent ingestion of the rodenticide. One aspect of this invention is a better appreciation of behaviour trends of mice and application of the information so gained to ensure that rodenticides are disposed where they will contaminate mice but not other species which may enter the area where pest control is being carried out.

According to one aspect of the present invention, an apparatus for containing at least one quantity of a rodenticide for contact with a rodent is provided, which comprises an elongate tube having an interior cross-section of such a shape and size as to allow the tube to be traversed by the rodent, each end of the tube being either open or provided with a detachable closure member, the tube having a length greater than a minimum length l as defined below and preferably being longer than a predetermined multiple of the length l as stated below and being provided with at least one series of two or more access holes for the rodent, whereby the rodent can pass into or out of the tube via any of the access holes and, if either or both of the ends are open, also via them, the access holes being located so as to define between adjacent holes at least one location for reception of a tubular open-ended rodenticide-bearing cartridge. The apparatus of the invention also comprises a kit of parts comprising at least one elongate tube as just defined, one or more tubular cartridges or one or more blanks or sets of parts for assembly as such tubular cartridges for location in and use with the one or more elongate tubes and, optionally, one or more detachable end closures for the or each elongate tube in the kit of parts. The elongate tube is shaped and dimensioned so that it can readily be traversed by mice, which are notably inquisitive, and one or more quantities of rodenticide are preferably disposed in the or each tube in one or more cartridges, which are typically in the form of short open-ended tubes internally coated with the rodenticide. This invention applies behaviour study results so as to ensure highly efficient contact between the mice and the rodenticide, whilst minimising contact with the rodenticide by the operating personnel making, assembling and installing the tubes, e.g. in food stores where mice infestation is to be prevented or treated.

The elongate tube may have one of many suitable cross-sections, depending upon relative ease of manufacture, the advantages of one shape over another in relation to assembly, storage and use of the tubes and many other factors. For instance, one advantageous form is given if the tubes are made with a circular cross-section. This shape is resistant to crushing and detachable end closures for the tubes do not need to be fitted into the ends in any particular orientation and can be simple bungs or plugs, therefore. The elongate tubes can be made of light metal, plastics material or card or paper, such as the kind of helically-wound paper tubes used for mailing purposes. Cylindrical tubes of this kind can produce some problems in connection with provision of the access holes, especially where the tubes are made of material which is suited to making the holes by a stamping or cutting operation, but cylindrical tubes have many advantages in manufacture and in use and are thus a preferred form of this invention. Other advantageous forms are given if the tubes have a polygonal cross-section, for instance a square, rectangular or triangular cross-section.

According to an especially preferred embodiment of the apparatus of the present disclosure, the one or more tubes used desirably have a cross-section which gives them a "floor", that is a flat portion which is lowest when the tubes are properly installed. Such tubes have the advantage that they remain in place on a level support. Square or rectangular tubes in particular can be positioned in the angle at the foot of a wall, which is especially useful where the invention is put into effect by making use of the behaviour habit of mice, which have been found to prefer to follow close to the wall of a room when seeking food.

Also, polygonal section tubes can be readily made from suitably drawn, extruded or moulded metal or plastics materials or they can be particularly conveniently made from card or heavy paper, which can be produced in the form of flat pre-creased and pre-punched blanks which can be readily folded into the requisite polygonal shape and secured, for instance by provision of a glue lap or by fixing the tube with appropriate securement devices. The access holes can be very advantageously produced in the stamping operation used to prepare the flat blanks by converting corrugated board for instance. Also, where closed-end tubes are required, these can be conveniently made up from blanks creased to allow folding into the desired polygonal cross-section, i.e. a prismatic shape, the end closures being arranged to secure the blanks in the tubular form. Where such closures are provided, they can be conveniently fixed in place by providing mating holes in the tube and the end closure, e.g. across a diameter of the tube, and passing a wire tie or other securing agent through the holes. Where it is desired to place tubes in stacked foodstuffs, for instance, between bags of flour, rice or some other such material, one or both end closures can be conveniently made pointed so that insertion (and removal in some cases) can be facilitated, by enabling the operator of the pest control system to push the tubes between the bags or into the stacked or stockpiled material. The wire tie or other securing agent on the trailing end of the tube can be made in the form of a long tail, to which an identifying label or other signal can be affixed. These labels will show where the tubes are placed in the foodstuff stockpile and also enable the tubes to be readily located when they are to be removed. Removal is facilitated if the trailing end closure is also pointed rather than flat, as it will be possible to withdraw the tubes by pulling the ends of the tails where the labels are attached. It has been discovered that the tubes are particularly effective if they have a "D" shape in cross-section, so as to have an elongate flat portion, which can be placed upon a floor or other level surface or can otherwise be located so as to be lowermost, and an elongate arched or curved portion forming the rest of the tube. One particular advantage of making the tubes with such a "D" shape in cross-section is that the flat portion forms a natural path or walk-way which the mice traverse readily. Also, it is possible to use any of a number of expedient ways of making cartridges, which either are also of "D" shape in cross-section or have a shape which fits readily into such a shape and which also allow such cartridges to be located at one or more selected places along each tube and to be fixed in place, so that mice have to pass through them and cannot dislodge them, thus making maximum contact with the rodenticide deposted in the cartridges.

The invention also makes use of open-ended tubular cartridges, which can have the rodenticide coated upon their inside surfaces and which are placed in the elongate tubes between the access holes and, therefore, so that they do not obstruct such holes. The cartridges can theoretically be of any convenient cross-section and shape, provided they allow, like the elongate tubes, for ready access by mice. In practice, it is preferable for the cartridges to be similar in external shape to the internal shape of the tube they are used with.

According to another preferred feature of the present invention, the cartridges used in the tubes (of whatever cross-section and other characteristics) have a raised internal portion carrying the rodenticide. This raised portion of a cartridge can have any of a wide variety of shapes and one important feature is that, whatever the shape is used, the mice have to reach or stretch over or otherwise pass above and come in contact with the raised portion, in order to proceed along the tube, and thus maximise contact between the rodenticide on the cartridge and, particularly, the fur on the underparts of the mice. The rodenticide is best-located in or on such raised part of each cartridge. Especially preferable shapes for these raised parts are triangular or trapezoidal in cross-section. They can suitably be shaped so that they can be placed along the tubes, thus forming a partial obstruction which the mice either step over or traverse with their feet on either side. In either case, there is very effective transfer of rodenticide from the upper parts of the raised internal portions of the cartridges to the underneath parts of the mice.

According to another aspect of this disclosure, the cartridges, with the raised internal parts desirably provided and located inside them, are constructed and arranged so as to have specific predetermined locations inside the tubes. Where the tubes have the preferred "D" shape in cross-section, it is readily possible to take advantage of this, because a "D" shape can be temporarily changed to a different shape, if the tube is made of suitably flexible material, so that cartridges can be slid into the tube to the desired locations and held in place when the tube is allowed to resume its normal "D"-shaped cross-section. Other or additional means can also be provided for ensuring proper location of the cartridges.

In order that the present invention may be readily understood and fully appreciated, reference is made, by way of example only, to the accompanying drawings, wherein various preferred forms of tube, cartridge and raised internal portion are illustrated; in the drawings:

FIG. 2 also shows rodenticide-bearing cartridges in place in the elongate tube;

FIG. 6 shows a perspective view, similar to FIG. 1, of a preferred form of elongate tube of "D" shape in section;

FIG. 7 shows two preferred forms of raised internal portions of cartridges, which can if desired be distinct components of the apparatus of the invention for treating, preventing or controlling mice infestation in an area;

FIG. 8 shows a raised portion in detail cross-section;

FIG. 9 shows diagrammatically one form of tube in longitudinal cross-section;

FIG. 10 shows a perspective view of one form of cartridge with a raised internal portion incorporated therein;

FIG. 11 shows a preferred form of apparatus of the invention, in partly broken-away perspective view, showing a D-section tube, having two triangular section cartridges therein, each cartridge having a rodenticide carrier assembled with the cartridge and forming a raised portion;

FIG. 12 shows a card or like blank, in flat form, for making cartridges of the preferred kind illustrated in FIG. 11;

FIG. 13 shows a perspective view of the carrier of FIG. 11, to illustrate how it is constructed and assembled with the blank of FIG. 12 to make the complete cartridge as shown in FIG. 11;

FIG. 14 shows diagrammatically an elongate tube, having the one or more cartridges located therein, the tube being such as is illustrated in any of FIGS. 1 2, 6, 9 or 11, in place in a foodstuff stockpile in the form of individual bags or sacks; it will be appreciated that FIG. 14 shows a particular form of tube by way of example only and that any form of apparatus according to this invention incorporating a tube and one or more cartridges can be used as shown.

Figure 1:
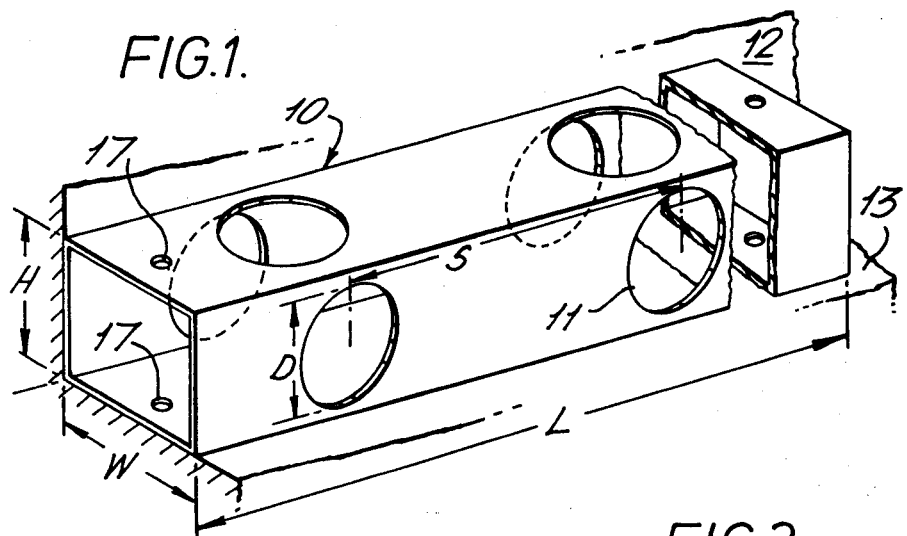
FIG. 1 shows a diagrammatic perspective view of an open-ended elongate tube of square cross-section.

Referring to FIG. 1, an elongate tube 10 is provided, having open ends and a square or rectangular cross-section. The tube 10 may be made of any suitable material, i.e. one which has no adverse effect on the user or on material such as a foodstuff with which it may be used. Suitable materials are light metals, e.g. aluminium, plastics materials, e.g. polyetheylene, or cardboard or wound paper. The latter is a particularly advantageous choice where it is desired to destroy the apparatus by combustion after use.

The tube 10 has access holes 11 at least in one of its sides and preferably in all sides or, at least, as shown in all except the side which forms the base in use. Thus there is at least one series of at least two access holes 11 in the tube 10. In practice, the tube 10 has a width W and a height H such that the tube 10 has a suitable internal cross-sectional shape and size for ready movement of mice along the tube; W and H obviously are equal if a tube 11 of square section is desired. The access holes 11 are also sized so as to allow ready movement of mice into and out of all sections of the tube 10. The holes 11 are conveniently circular, though other shapes can be chosen; assuming for convenience that circular holes 11 have been provided, as illustrated in FIG. 1, the diameter of the holes 11 is indicated at D and their centre-to-centre spacing is indicated at S. The tube 10 has dimensions such that each of W and H is 15 to 50 mm, though they need not be equal. D is also 15 to 50 mm, except that in practice the holes 11 clearly cannot have the maximum diameter of 50 mm if the tube 10 is square or rectangular as shown in FIG. 1. The tube 10 has at least two holes 11 in each side and preferably 4 or more of such holes. D can have the maximum diameter of 50 mm, for example, if the holes 11 are, say, elliptical and measures 50 mm×40 mm on the major and minor axes and are located in tube where H or W or both are more than 40 mm and the major axes of the holes 11 run in the longitudinal direction of the tubes 10. Where the holes 11 are provided in some or all of the sides of a polygonal tube, as exemplified in FIG. 1, the holes of the respective series are provided at the same distances from an end of the tube 10. The minimum length, l, which the tube 10 must exceed in accordance with this invention, in the present case of tubes for mice control, is 500 mm. The access hole spacing S in a tube is not less than 150 mm, where there is more than 1 access hole along any single side of the tube.

As shown in FIG. 1, the tube 10 is preferably located, in carrying out the pest control method of the invention, so that it is adjacent the wall 12 and on the floor 13 and thus fits closely into the angle between them. This location is suitable for any form of tube according to the invention and especially those such as are shown in FIGS. 1, 6, 7, 9, 10 and 11 which have a floor. Since marauding mice often follow walls, e.g. skirting boards, when passing through a room, the tubes so positioned will lie in the positions most likely to be traversed by the mice, which therefore tend to go through the tubes or at least one or more parts of them between the various access holes 11. A rodenticide may be applied to all or parts of the inside surface of the tube 10 and will thus become adhered to the animals through contact and will be ingested by them. Either an acute (single-dose) or chronic (multi-dose) rodenticide may be used.

Preferably, however, the rodenticide is applied to the insides of tubular cartridges which are located in the tubes 10 in the regions between the access holes 11. These regions provide locations for the cartridges and the tubes 10 can be provided with peripheral ridges or other formations which assist in defining these locations and providing fixed positions for the cartridges. These need to be readily insertable into and removable from the tubes 10 and, so as not to produce any appreciable obstruction of the tubes 10, they also need to be a relatively close fit to be thin-walled, at least sufficiently to ensure that the cartridges are of substantially the same internal diameter or, more generally, of substantially the same internal dimensions in cross-section as the tubes they are located in.

Figure 2:
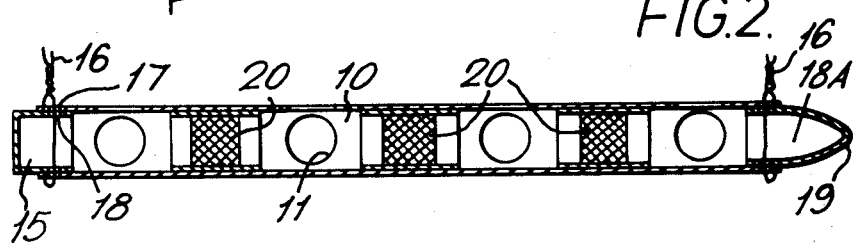
FIG. 2 shows an axial cross-section through the tube of FIG. 1, provided with different forms of detachable end closure cap.
Figure 3:
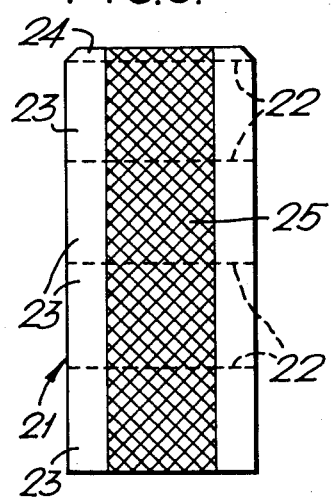
FIG. 3 shows a cartridge of the kind illustrated in FIG. 2, but in flat blank form.

A tube 10 of square cross-section, provided with a series of four access holes 11 in each side, is shown in FIG. 2. At one end, a removable flat-ended closure member 15, in the form of a cup-shaped member which fits loosely into the end of the tube 10, is inserted and detachably secured by means of a wire tie 16 which passes through small holes 17 (see FIG. 1) in the tube 10 and corresponding holes 18 in the closure 15. The opposite end of the tube 10 is shown closed in a similar manner, except that the closure 18 exhibits a pointed outer shape 19 and so the end of the tube 10 fitted with it can be more conveniently passed into or between foodstuffs, as explained above and illustrated, as described in more detail below, in FIG. 14. Between the adjacent access holes 11, the tube 10 contains three rodenticide-bearing cartridges 20. Each can be made in flat form as shown in FIG. 3. This illustrates a cartridge blank 21 in the form of a rectangle of cardboard, having four parallel creases 22 dividing it into four side panels 23 and a glue lap 24. The latter can be coated with a glue and the central region 25 of the cartridge blank 21 is coated with a rodenticide. The blank 21 can be folded about the crease lines 22 into a square tube or cartridge 20, as shown in FIG. 2, the glue lap 24 being attached to the free edge of the farthest panel 23. The rodenticide 25 then forms a band around all the inside of the cartridge 20 except for its regions adjacent its open ends. It can thus be safely handled by pest control personnel, as the rodenticide cannot be accidentally touched when the assembled cartridges have to be handled for assembly in the tube 10. The cartridge blank 21 may conveniently be made of cardboard which is waxed on the outside. The cartridges can of course be made in many other ways.

Figure 4:
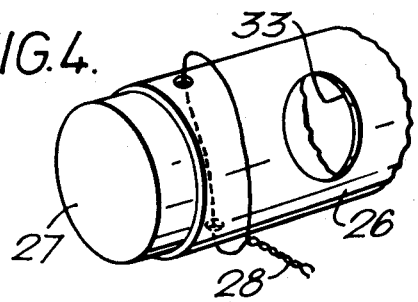
FIG. 4 shows a detail, in perspective view, of part of an elongate tube and end closure of circular cross-section.
Figure 5:
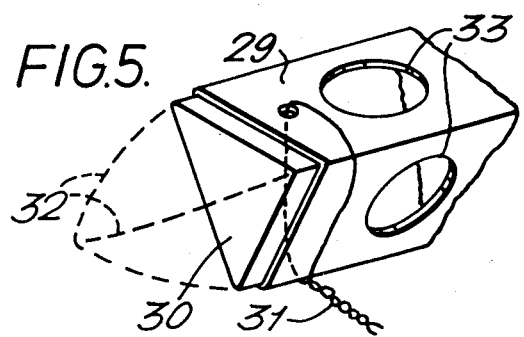
FIG. 5 shows a detail similar to FIG. 4 of part of an elongate tube and end closure of triangular cross-section.

In FIG. 4, an end of a cylindrical tube 26, i.e. of circular cross-section, is shown, with a flatfaced end closure 27, e.g. a bung, secured by a wire tie 28. FIG. 5 similarly shows a triangular section tube 29, with a triangular closure 30 again secured by a wire tie 31, the dotted lines 32 indicating the modified shape externally which the closure 30 may have if it is to present a point like the pointed end 19. Typical access holes 33 are shown in FIGS. 4 and 5.

FIG. 6 shows a partial perspective view of a preferred form of tube 10. This is of "D" shape in cross-section having a flat lower floor portion 11 and an arched portion 12 extending from one side to the other of the floor portion 11. The tube 10 has a width W, e.g. 25 mm, and a height, H, e.g. 32 mm. Circular holes 13 are provided in the arched portion 12 at intervals along the tube 10. The tube 10 can be made from paper, plastics material or many other suitable constructional material and can very conveniently be in the form of length of tubular extrusions in which the holes 13 are then provided, e.g. by a stamping operation.

FIG. 7 shows how a tube 10 of the kind shown in FIG. 6, shown in broken lines, is provided with one or more cartridges holding a quantity of rodenticide, which is coated on or is otherwise available for transfer, by contact, from the upper parts of raised internal portions. Two of these are shown at 14 and 15. The raised internal portion 14 can itself form a "cartridge" or preferably is located within a short piece of open-ended tube of "D" section (not shown) which itself forms the cartridge. The example shown at 14 is a length of hollow triangular-section tube, coated on its outer surfaces, at least at the top, with a rodenticide, preferably in the area 16 between the broken lines 17. The portion 15 is of trapezoidal section and can be of closed-ended construction as shown, the three upper faces being covered with an absorbent material, e.g. thick felt or plastics foam, which can be impregnated with a solution of rodenticide. This type of raised portion 15 can conveniently serve as a container for a quantity of rodenticide solution and this is gradually transferred to the absorbent material on the outer surfaces by capillary action, there being fluid communication between the felt or other absorbent material and the interior of the portion 15, which may also contain impregnated absorbent material.

FIG. 8 shows in cross-section one form of raised portion of the kind shown in FIG. 7 at 15. This raised portion or "cartridge" or cartridge insert consists of a hollow chamber 18 of triangular cross-section, with open or, as shown, closed ends; the chamber 18 is open along the apex of the triangle uppermost in use and this forms a slot, into which project the edges of strips 19 of absorbent textile material, e.g. felt, which are attached to the outer faces of the faces of the triangle on either side of the slot. The strips 19 preferably project down to the inside of the third face of the triangle, as indicated at 20. The hollow chamber 18 forms a reservoir for a large quantity of rodenticide and is filled e.g. with a solution 21 of a contact rodenticide, which impregnates the strips 19 and is gradually replenished over a long period, as the solution is removed from the strips 19 of textile material by repeated contacts with mice.

FIG. 9 shows a diagrammatic side sectional view of a tube 22 having holes 23 (like the holes 13 of FIG. 6) at intervals along its sides. The tube 22 is preferably of "D" shape in cross-section. At spaced intervals along its length, the tube 22, which preferably is moulded in flexible plastics material, has a number of parts 24 of slightly larger cross-section forming locations for receiving rodenticide cartridges, as indicated in broken lines at 25; a raised internal portion in the cartridge 25 is similarly indicated at 26. The tube 22 can be slightly deformed from its "D" shape, e.g. being made more truly circular, so that the cartridges 25 with their interior raised portions 26 can be slid along to the locations 24, when the deformation is released and the tube 22 resumes its normal cross-sectional shape with the cartridges 25 held in their desired positions.

Such a cartridge is shown in fragmentary perspective view in FIG. 10, wherein the raised internal portion 26 is a cartridge insert and has a trapezoidal section with sloping ends 27 and is formed integrally with the base 28 of the cartridge 25, which in use sits on the flat floor of the "D" section tube, e.g. the tube 20 of FIG. 6 or the tube 22 of FIG. 9. The sides of the cartridge base 28 are joined by an arched portion 29 forming the remainder of the body of the cartridge, which itself is of "D" section, like the tubes 10 and 22.

A preferred form of kit of parts for use in making up apparatus according to this invention is illustrated in FIGS. 11 to 13 of the drawings. In FIG. 11, a tube 100 is shown which is a plastics or light metal extrusion of open-ended tubular form having a "D" shape in cross-section. The base 101 of the extrusion forms the floor of the tube 100 in use and the remainder consists of an integral arched element 102. The tube 100 preferably has a length of 500–1000 mm, optimally 800 mm, a width at the floor of 40–50 mm, optimally 45 mm, and a height approximately the same as the width. At the centre of the tube 100 on each side, a round or elliptical access hole 103 is provided, such hole having a diameter of approximately 35–40 mm if circular and comparable dimensions, e.g. 35–40 mm vertically and 35–55 mm horizontally if elliptical. The tube 100 can be readily located in position as described, for instance in relation either to FIG. 1 above or to FIG. 14 below, and can easily be retrieved after a period of use.

Two identical cartridges 104 are located in the tube 100, each cartridge 104 being a cardboard construction of open-ended triangular cross-section, occupying substantially the internal width of the floor or base 101 of the tube 100 and also its internal height and extending from one end to a position adjacent but short of the centre, so as not to obstruct either of the access holes 103. Each cartridge 104 thus has a length of 200–400 mm. Within each cartridge 104, a cartridge insert 105 is provided, in the form of a plastics or light-metal extrusion which includes an opposed pair of slightly inwardly inclined side plates or webs 106 holding between them a pad 107 of plastics foam or heavy duty felt, for example, impregnated with a suitable rodenticide. Each cartridge insert 105 with its pad 107 forms a raised portion in the central region of the base of the cartridge 104 and thus in the base of the tube 100 and this maximises contact between mice and the rodenticide as the mice pass by or over the pad 107. To avoid contamination of the hands of operative personnel who handle the tubes 100 and cartridges 104 for assembly and location purposes, each cartridge insert 105 with its foam or felt pad 107 is approximately 50–100 mm in length, so that a free space of at least 100 mm is provided at each end of the cartridge 104, before reaching the nearest part of the insert 105 or the foam or felt pad 107 held in it. The inserts 105 are preferably located centrally in the cartridges 104 and the relative dimensions of them are preferably within the ranges indicated and are preferably such, in any case, that the free space at each end of each insert 105 is greater than finger length, so that it is extremely unlikely that anyone handling a cartridge 104 could touch or otherwise contact the pad 107 or the rodenticide on it.

As shown in FIG. 12, the cartridge 104 is desirably made from a flat blank of card, illustrated at 108. This consists of a rectangle having a length, L1, equal to that of the cartridge 104 and a breadth, B1, approximately 3 times the width of the tube 100 it is to be used with. The blank 108 is divided into three approximately equal strips 109, 110 and 111 by parallel crease lines 112 and 113. A transverse or (as shown) longitudinal rectangular aperture 114 is located centrally in the middle strip 110, which forms the base of the triangular cartridge 104 in use, and this aperture 114 receives the cartridge insert, such as the insert 105. A securing flap 115 is formed on the free side of the strip 109 and extends along a major part of its length. The ends of the flap 115 are preferably shaped as shown, so that the length of the flap 115 increases from its edge towards the strip 109, but sharply decreases adjacent the latter by reason of acute cut-outs 116. A complementary securing flap 117 is formed on the free side of the strip 111 and extends along the entire length of it, being secured at each end along a crease line, 118. It is otherwise defined by a slot 119 whose length equals that of the crease line 120 separating the other flap 115 from the strip 109. The blank 108 is made up into the cartridge 104 of triangular section by bending it about the crease lines 112 and 113, folding in the flap 117 about the aligned crease lines 188 and slot 119 and then folding the flap 115 about the crease line 120 and inserting the flap 115 into the slot 119. Since the latter is similar in length to the crease line 120 and the flap 115 is slightly longer, it is necessary to force the flap 115 into the slot 119 and so lock them together, so that the cartridge 104 when so assembled, as shown in fragmentary view in FIG. 11 for the left-hand cartridge and mainly in broken lines for the right hand cartridge cannot be accidently opened up into a flat condition. Therefore, the rodenticide carrier or insert 105 can be positioned positively in the rectangle 114 in the cartridge 104 either before or after completing assembly of the cartridge 104 itself, without it then being normally feasible to contact the pad 107 or the rodenticide on it. The carrier or insert 105 can be made as shown in FIG. 13 from a length of plastics material or light metal in the form of an extrusion having a cross-section approximately to an inverted shape. The opposed pair of side plates or webs 106 are attached to a flat base web 121 and the entire extrusion 105 is the same in length as the rectangle 114 cut out of the cartridge blank 108. The webs 106 are preferably undercut where they meet the base web 121, as indicated at 122, and the upper corners of the webs 106 can be removed as indicated in broken lines at 123. The latter feature facilitates insertion of the assembled cartridge insert 105 into the cartridge 104, while the notched or undercut corners 122 provide a positive lock firmly holding the carrier or insert 105 in place. The base web 121 between the side webs 106 forms a lower support for the felt pad 107, while outside the webs 106 the base web 121 forms opposed flanges which contact the underside of the strip 110 in the assembled cartridge 104 and so prevent the insert 105 from being accidentally pushed too far into the triangular space inside the cartridge. In practice, these flanges lie between the cartridge 104 and the floor of the tube 100, but this is not shown in FIG. 11 in order to keep the drawing clear.

FIG. 14 shows a foodstuff stockpile in the form of filled bags or sacks 34. A pest control tube 35 like that shown in FIG. 2, but which may have any form according to the invention, is inserted between the sacks 34.

A long wire or other tail 36 is attached to or is formed by the closure securement tie 16 and carries an identification label 37. In use, the tubes, such as the tube 35, constitute pathways or passageways which the mice will enter and traverse, often in preference to other possible routes, so that maximum contact with rodenticide located in the tubes or in cartridges located in them will be achieved. Arrangements for attaching such ties can be provided with any form of tube, with or without end closures, for instance as shown in FIGS. 4 and 5 or as can be attached to the small holes at the ends of the tubes, as shown in FIGS. 1 and 6.

The devices described above maximise contact between the mice and the rodenticide, particularly in view of the raised internal portions in the cartridges. These projections inside the cartridges are dimensioned, as indicated, so that mice traversing the tubes cannot pass the projections or raised internal portions without brushing against the rodenticide.

The invention thus provides, as another aspect, a method of selective rodent or other pest control in a region, e.g. an enclosure such as a foodstuff storeroom, which comprises assembling one or more elongate tubes with an appropriate pesticide distributed at one or more selected locations within each tube, preferably by means of rodenticide cartridges, disposing the prepared tubes within the region, i.e. round its periphery or around or within the foodstuff disposed in the region, and removing some or all of the tubes after a predetermined time period. The invention also consists of a region, with or without a commodity such as a foodstuff stored therein, which has been subjected to a method of selective pest control according to this invention. Particular features of the apparatus of the invention and the resultant advantages include:

(1) The use of replaceable cartridges which include floor projections, which carry the rodenticide and so confine it to a relatively small area which is inaccessible to non-target animals. It has been found that, by this technique, the rodenticide is readily transferred to the underside of the mouse and then ingested during grooming. This is more effective than techniques which transfer the rodenticide to the head or back of the animal.

(2) The rigidity of the outer tubes gives desirably high mechanical strength to the apparatus used in the pest control system of this invention, the side apertures and the open ends giving increased entry options for the target animals. It has been established that, where some animals initially will tend to travel along the top or sides of tubes rather than go in at the ends, they will often enter side apertures, thus increasing the speed of action of the system. By making the tubes at least 500 mm in length, they can serve very well as mice control inserts in palletised stock, for instance.

(3) The strength of the tubes, coupled with the arrangement of the rodenticide in cheap disposable cartridges provides a greatly increased safety factor, as compared with known systems, especially as the rodenticide in the apparatus of the invention is not contactable by non-target animals. The invention provides a safe, relatively cheap, easily installed and flexible system employing relatively small quantities of active ingredients.

We claim:

1. An apparatus for containing at least one quantity of a contact rodenticide, comprising:
    (a) an elongate tube having an interior cross-section which allows the tube to be traversed by rodents of a selected target species,
    (b) the tube having a uniform interior cross-section which includes at least one planar portion serving as a floor for the tube in use,
    (c) the length of the tube being at least 500 mm,
    (d) the tube having at least two access holes for target species rodents, said access holes being disposed in the portion of the tube wall which is away from the planar portion serving as the tube floor in use, whereby target species rodents can pass into and out of the tube via any of the access holes when the tube is being supported via its planar portion,
    (e) at least one location for receiving and holding a cartridge comprising a quantity of a contact rodenticide each such location being removed from any access hole, and
    (f) a cartridge comprising a quantity of a contact rodenticide positioned at each location, such cartridge being of such a size and shape as not substantially to obstruct either the interior of the tube or any access hole and so allowing a target species rodent to reach or pass and thus make contact with the rodenticide, the cartridge comprising an open-ended tubular element having the rodenticide coated upon the interior thereof over an area excluding the end regions of the cartridge.

2. An apparatus for containing at least one quantity of a contact rodenticide, comprising:
    (a) an elongate tube having an interior cross-section which allows the tube to be traversed by rodents of a selected target species,
    (b) the tube having a uniform interior cross-section which includes at least one planar portion serving as a floor for the tube in use,
    (c) the length of the tube being at least 500 mm,
    (d) the tube having at least two access holes for target species rodents, said access holes being disposed in the portion of the tube wall which is away from the planar portion serving as the tube floor in use, whereby target species rodents can pass into and out of the tube via any of the access holes when the tube is being supported via its planar portion,
    (e) at least one location for receiving and holding a cartridge comprising a quantity of a contact rodenticide each such location being removed from any access hole, and
    (f) a cartridge comprising a quantity of a contact rodenticide positioned at each location, such cartridge being of such a size and shape as not substantially to obstruct either the interior of the tube or any access hole and so allowing a target species rodent to reach or pass and thus make contact with the rodenticide, the cartridge comprising a cardboard blank coated with the rodenticide and formed into a tubular element which is of about the same cross-sectional shape as the tube in which it is disposed.

3. An apparatus for containing at least one quantity of a contact rodenticide, comprising:

(a) an elongate tube having an interior cross-section which allows the tube to be traversed by rodents of a selected target species,
(b) the tube having a uniform interior cross-section which includes at least one planar portion serving as a floor for the tube in use,
(c) the length of the tube being at least 500 mm,
(d) the tube having at least two access holes for target species rodents, said access holes being disposed in the portion of the tube wall which is away from the planar portion serving as the tube floor in use, whereby target species rodents can pass into and out of the tube via any of the access holes when the tube is being supported via its planar portion,
(e) at least one location for receiving and holding a cartridge comprising a quantity of a contact rodenticide each such location being removed from any access hole, and
(f) a cartridge comprising a quantity of a contact rodenticide positioned at each location, such cartridge being of such a size and shape as not substantially to obstruct either the interior of the tube or any access hole and so allowing a target species rodent to reach or pass and thus make contact with the rodenticide, the cartridge comprising a raised rodenticide-bearing absorbent member located within a tubular element having a uniform cross-section similar to that of the associated tube and including at least one planar portion serving as a floor for the cartridge and cooperating with the floor portion of the tube, whereby a target species rodent traversing the tube can also traverse the cartridge and pick up rodenticide therein.

4. An apparatus according to claim 3, wherein the absorbent member comprises a pad held in a cartridge insert which comprises an upwardly-directed channel member, a liquid rodenticide absorbed upon the pad and the pad being located partly within the channel member and partly exposed on the top or side thereof, whereby rodenticide is transferred from within the channel member to the exposed part of the pad.

5. An apparatus for containing at least one quantity of a contact rodenticide, comprising:

(a) an elongate tube having an interior cross-section which allows the tube to be traversed by rodents of a selected target species,
(b) the tube having a uniform interior cross-section which includes at least one planar portion serving as a floor for the tube in use,
(c) the length of the tube being at least 500 mm,
(d) the tube having at least two access holes for target species rodents, said access holes being disposed in the portion of the tube wall which is away from the planar portion serving as the tube floor in use, whereby target species rodents can pass into and out of the tube via any of the access holes when the tube is being supported via its planar portion,
(e) at least one location for receiving and holding a cartridge comprising a quantity of a contact rodenticide each such location being removed from any access hole, and
(f) a cartridge comprising a quantity of a contact rodenticide positioned at each location, such cartridge being of such a size and shape as not substantially to obstruct either the interior of the tube or any access hole and so allowing a target species rodent to reach or pass and thus make contact with the rodenticide, the cartridge comprising a tubular element of such a size and shape as to be held in the selected location within the tube, the tubular element having an aperture therein for receiving and holding a cartridge insert mounted in the tubular element from outside and comprising a holder carrying an absorbent rodenticide-bearing pad which is exposed within the tubular element, the tubular element having a length to fill a section of the elongate tube without obstructing any access hole and the insert being spaced from either end of the tubular element by at least finger length, whereby manual contact with the rodenticide within the assembled cartridge is prevented.

6. An apparatus according to claim 5, wherein the tubular element is formed from a cardboard blank which folds to a triangular cross-section having an aperture in one face thereof for lockingly receiving an associated cartridge insert.

* * * * *